United States Patent [19]

Cline

[11] 3,875,666

[45] Apr. 8, 1975

[54] APPARATUS FOR DETECTING SURFACE IRREGULARITIES

[75] Inventor: Frank W. Cline, Arcadia, Fla.

[73] Assignee: Frank Cline Tractor Service & Manufacturing Company, Inc., Arcadia, Fla.

[22] Filed: May 21, 1973

[21] Appl. No.: 362,326

[52] U.S. Cl. ............................ 33/174 R; 404/129
[51] Int. Cl. ............................................. G01b 5/28
[58] Field of Search ........ 33/174 R, 174 P; 404/129

[56] References Cited
UNITED STATES PATENTS

| | | | |
|---|---|---|---|
| 1,237,406 | 8/1917 | Stoner | 404/129 |
| 2,047,327 | 7/1936 | Muirhead et al. | 33/174 R |
| 2,175,496 | 10/1939 | Troyer | 33/174 R |
| 2,197,183 | 4/1940 | Keeler | 404/129 |
| 3,071,051 | 1/1963 | Martin | 404/129 |
| 3,136,070 | 6/1964 | Keen et al. | 33/174 R |
| 3,344,721 | 10/1967 | Ferm et al. | 404/129 |
| 3,675,546 | 7/1972 | Smith | 404/129 |

*Primary Examiner*—Richard E. Aegerter
*Assistant Examiner*—Richard R. Stearns
*Attorney, Agent, or Firm*—Mason, Fenwick & Lawrence

[57] ABSTRACT

A wheeled vehicle is disclosed having a surface sensor mounted for vertical movement on a main frame with the surface sensor detecting surface irregularities in a freshly paved surface with spun glass pad supporting cups being provided on spring biassed support members adjacent wheels of the vehicle for engagement with the periphery of the wheels to coat the wheels with a light coating of oil and to remove asphalt particles from the surface of the wheels to prevent the wheels from creating an undesirable motion of the frame with respect to the sensor to create a false surface irregularity signal.

4 Claims, 6 Drawing Figures

PATENTED APR 8 1975 3,875,666

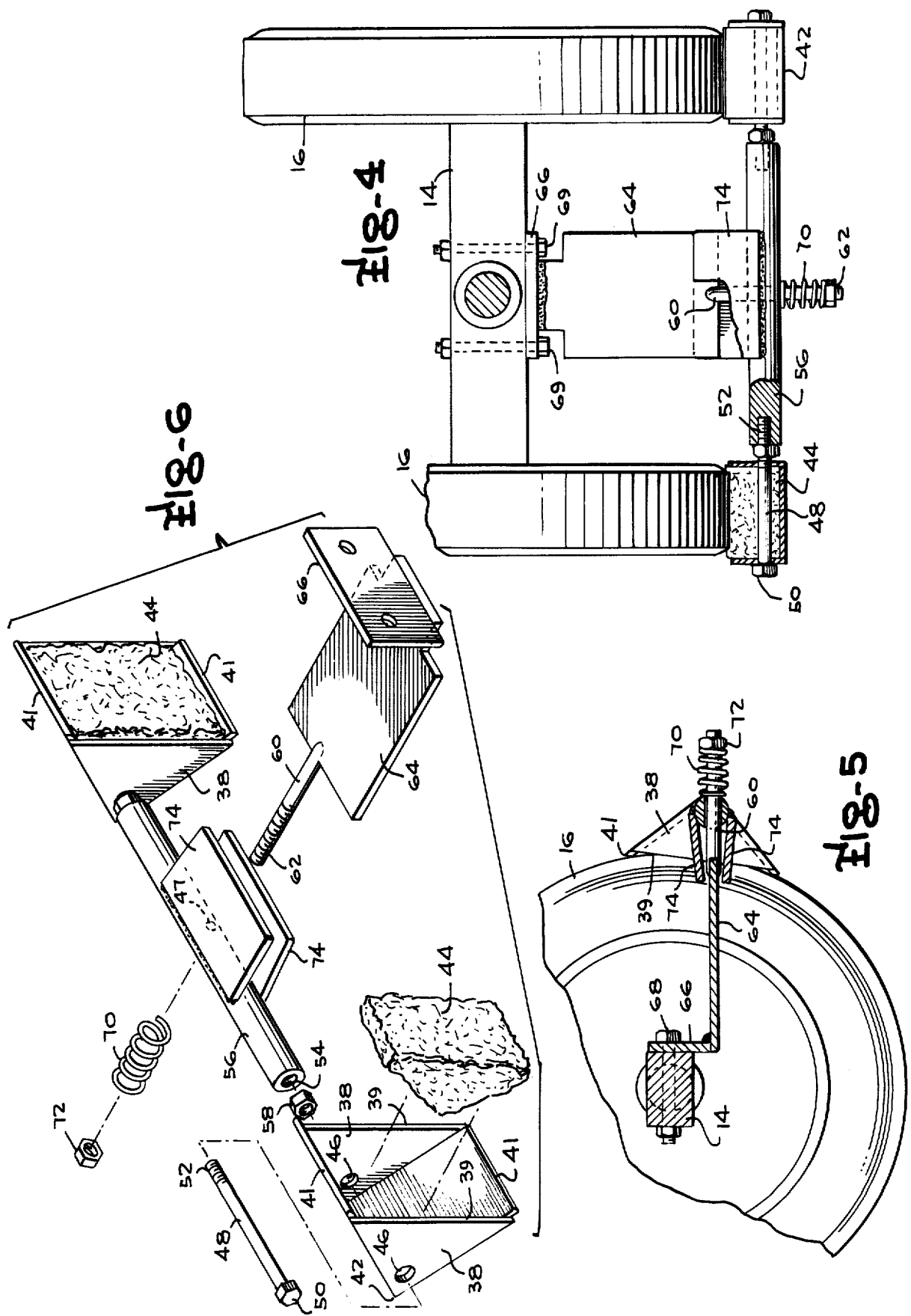

APPARATUS FOR DETECTING SURFACE IRREGULARITIES

This invention is in the field of measuring and detecting devices and is specifically directed to apparatus for detecting undesirable surface irregularities of a newly paved asphalt or the like surface.

Vehicles mounting surface sensing means have previously been employed for movement over newly paved surfaces with the vehicles including a sensor engaging the newly paved surfaces so that the sensor moves in a vertical direction in response to the detection of a surface irregularity. Movement of the sensor creates an operation of a marking means to mark the surface adjacent the irregularity so that corrective repair of the freshly paved surface can be made. Unfortunately, prior known devices of the aforementioned type, such as that illustrated in U.S. Pat. No. 3,136,070, have sometimes provided erroneous markings on the newly paved surface in circumstances in which there were actually no surface irregularities. Such erroneous markings have occurred by virtue of the adherence of asphalt particles to the wheels of the vehicle with such adhering particles creating a false upward movement of the vehicle frame with respect to the sensor as the vehicle is rolled forwardly and the false upward movement creates a signal resulting in the erroneous marking of the surface.

The object of this invention is the provision of new and improved means for detecting surface irregularities in newly paved surfaces.

Achievement of the object of this invention is enabled by the provision of a wheeled vehicle having front and rear wheels between which an elongated vehicle frame member extends. A surface sensing unit is mounted medially of the elongated frame member and includes a wheel engaging the newly paved surface with the wheel being moved vertically with respect to the frame upon the detection of a surface irregularity. A cup is provided adjacent each of the wheels of the vehicle with the cup including an oil impregnated spun glass pad engageable with the rolling surface of the wheels with which it is associated. The oil impregnated cup is of triangular cross-section and is formed of an angle member connected on each end by triangular end plates. The outer edges of the angle member engage the rolling surface of the wheel with which the particular cup is associated to provide a scraping action on the surface. Moreover, the oil impregnated spun glass pad serves to coat the outer surface of each of the wheels and prevent further adherence of asphalt particles to the rolling surface. The pad containing cup members are biassed toward each of the wheels by a compression spring engaging a transverse cup supporting shaft mounted for linear movement toward and away from each of the wheels. Consequently, the spun glass pads and the scraping surfaces of the cups are always in a desired degree of contact with their respective wheels.

A better understanding of the manner in which the preferred embodiment accomplishes the foregoing object will be achieved when the following written description is considered in conjunction with the appended drawings in which:

FIG. 4 is a sectional view taken along lines 4—4 of FIG. 2;

FIG. 5 is a sectional view taken along lines 5—5 of FIG. 2; and

FIG. 6 is an exploded perspective view of a portion of the preferred embodiment.

Figure 1:
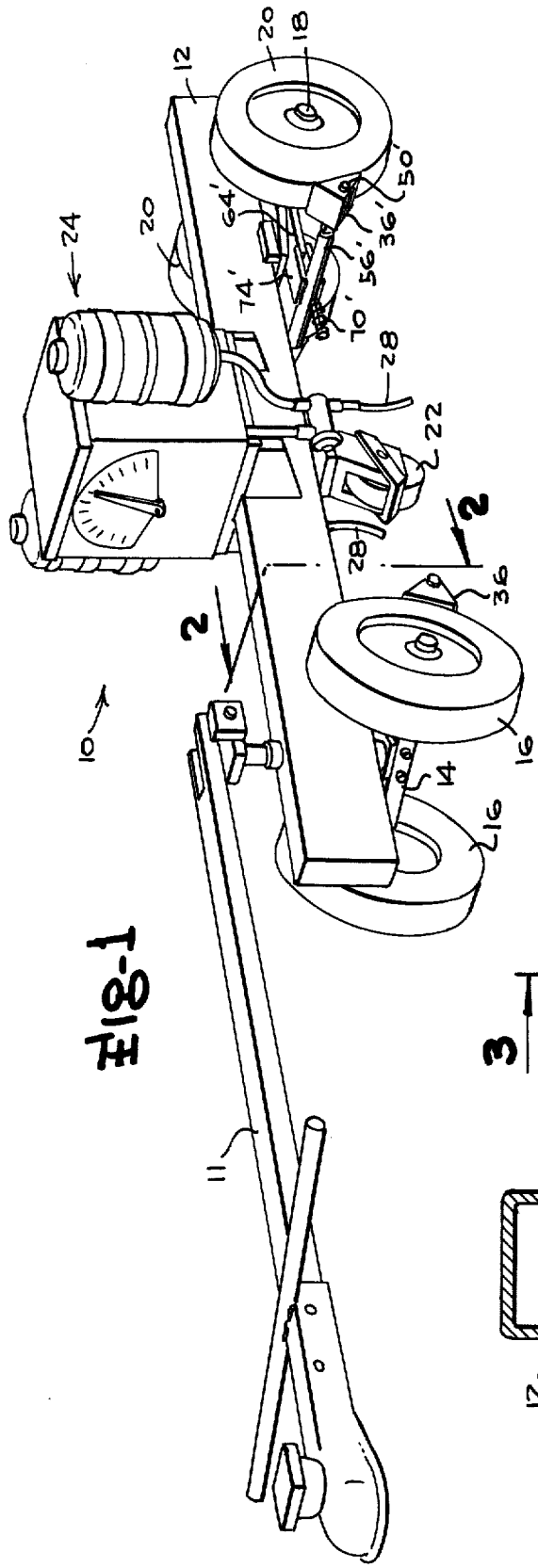
FIG. 1 is a perspective view of the preferred embodiment of the invention.

Turning now to the drawings, and with initial reference to FIG. 1, a vehicle 10 is disclosed comprising a towing tongue 11, an elongated frame member in the form of an elongated beam member 12 which is supported by a front axle 14, front wheels 16, a rear axle 18 and rear wheels 20.

A ground engaging sensor wheel 22 is supported for vertical movement medially of the frame member 12 and is part of an actuating and indicating mechanism generally designated 24 which senses vertical movement of the wheel 22 which indicates a declination or an elevation of the surface 26, which is normally a freshly asphalted surface, over which the vehicle is being operated to provide a discharge of marking fluid through lines 28 to mark the surface 26. The details of the actuating mechanism 24 are identical to those of earlier U.S. Pat. No. 3,136,070 issued on June 9, 1964 of which I am a co-inventor and the disclosure of which is incorporated herein specifically by reference thereto.

In operation, the vehicle 10 is moved over the newly paved asphalt surface 26 by means of the tongue member 11 etc. It has been found that movement of the supporting wheels over a freshly paved surface results in the adherence of minute asphalt particles to the outer periphery of the wheels to cause undesirable vertical movement of the wheels and result in an erroneous movement of the frame 12 with respect to the sensor wheel 22 to cause a false marking of the surface 26 where there is actually no surface irregularity. It has been found that the clinging of asphalt particles to the wheels can be eliminated by the provision of means associated with all of the wheels for coating the wheels with a thin coating of oil and for brushing against the outer periphery of the wheels to physically remove asphalt particles. The present invention is directed to the foregoing discovery and means for effecting its purpose.

The coating and cleaning means employed with the front wheels will be discussed intially with it being understood that the coating and cleaning means employed with the rear wheels is identical to that employed with the front wheels, with the designators of the rear wheel apparatus comprising primed designators identical to the corresponding unprimed designators applied to the parts of the front wheel apparatus.

Figure 3:
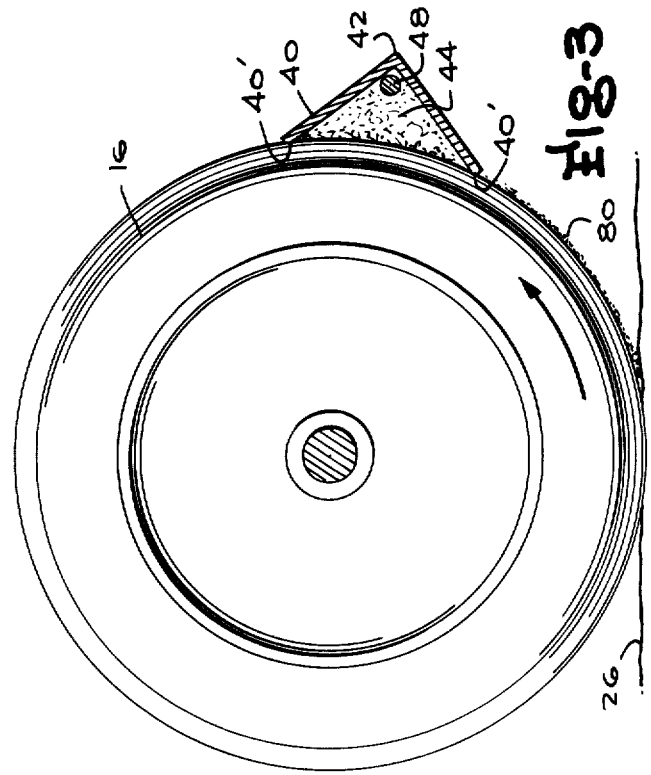
FIG. 3 is a sectional view taken along lines 3—3 of FIG. 2.
Figure 2:
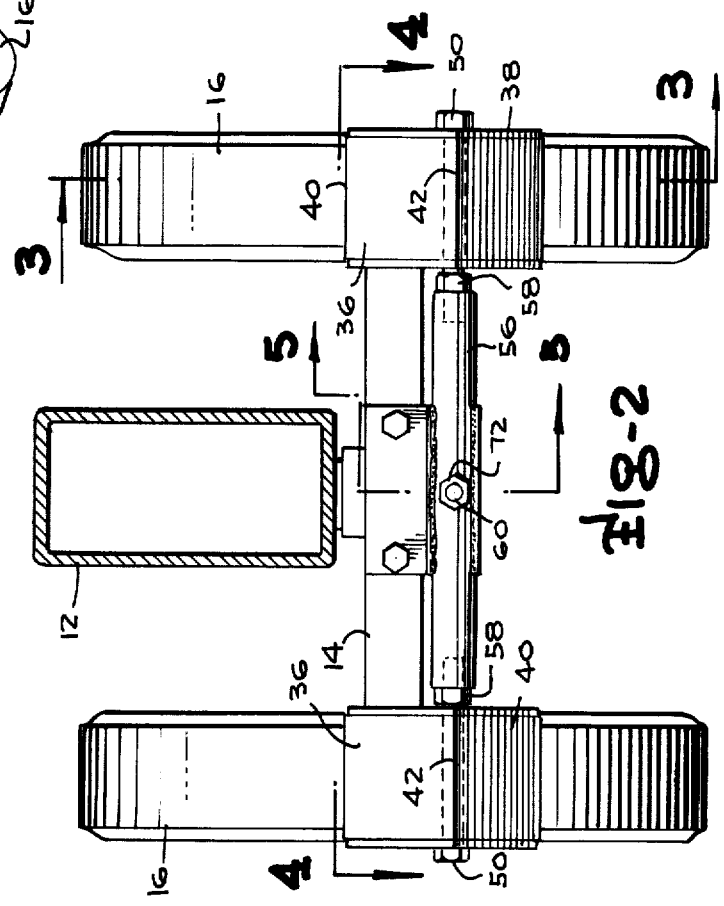
FIG. 2 is a sectional view taken along lines 2—2 of FIG. 1.

The specific means employed includes two front fiberglass pad containing cups 36 each formed of triangular end plates 38 connected by an angle member 40 defined by two plates intersecting at an apex 42 (FIG. 3). The front spun glass containing cups 36 each contain a spun glass pad 44 that is impregnated with oil and pivotal support for the cup is enabled through apertures 46 formed in the triangular end plates and through which pivot pins 48 extend.

Pivot pins 48 are provided with head flanges 50 and threaded end portions 52 that are received within the confines of threaded openings 54 coaxially formed in the ends of a front transverse cup supporting shaft 56. Lock nuts 58 maintain the pivot pins 48 in position on the front transverse supporting shaft 56 in an obvious manner. Forward scraper edges 41 of the angle members 40 extend beyond the edges 39 of the triangular side plates 38 for engagement with the outer running surface of the wheels 16 to physically remove any asphalt or other particles adhering to the wheel surface.

Front transverse cup supporting shaft 56 is supported on a front support rod 60 extending through a central aperture 47 in shaft 56 and threaded at 62 on its outer end and extending in a cantilever manner from a horizontal guide plate 64 of a bracket member including an attachment plate 66 having apertures through which bolts 69 extend for connection to the front axle 14 as best illustrated in FIGS. 4 and 5.

A coil compression spring 70 encircles the outer end of the front support rod 60 and is held on the rod by a nut member 72. A pair of slip plates 74 are welded to the outer periphery of the front transverse cup supporting shaft 56 and are spaced apart a sufficient distance to be received over the horizontal guide plate 64 in a sandwiching manner as best illustrated in FIG. 5. Consequently, spring 70 serves to urge the front transverse cup supporting shaft 56 forwardly toward the wheels 16 and the plates 74 maintain the shaft in horizontal alignment by preventing rotation of the shaft 56 about the front support rod 60 in a manner that will be apparent from inspection of FIGS. 4 through 6.

The coating and cleaning means associated with the rear wheels 20 is identical to the coating and cleaning means associated with the front wheels as just described with the exception that the rear means extends forwardly of the rear axle as shown in FIG. 1. Those components of the rear coating and cleaning means illustrated in FIG. 1 are provided with the same designators as their corresponding components associated with the front wheels but with the rear designators being primed.

In operation, the device is moved over the newly paved surface 26 and any asphalt particles 80 adhering to the outer periphery of the wheels will be scraped from the surface by the edges 41 of the angle member 40. Additionally, the spun glass pad 44 provides an additional mechanism removal of any asphalt particles. Moreover, the spun glass pad 44 is impregnated with oil serves to coat the outer periphery of the wheels so as to substantially eliminate or lessen the adherence of asphalt particles to the outer surface of the wheels. Consequently, the subject invention provides a new and improved system for detecting surface irregularities in newly paved asphalt surfaces or the like. While numerous modifications of the invention will undoubtedly occur to those of skill in the art, it should be understood that the spirit and scope of the invention is to be limited solely in light of the appended claims.

What is claimed is:

1. In an apparatus for detecting and marking surface irregularities of newly paved surfaces or the like of the type comprising a vehicle having a plurality of supporting wheels, frame means supported by the supporting wheels, surface engaging and sensing means supported by said frame means and marking means actuated by said surface sensing means for marking the surface in response to the detection of a surface irregularity by said surface sensing means, the improvement comprising cleaning and coating means including spun glass pad members and pad supports having individual pad container cups formed of first and second spaced parallel triangular end plates connected by an angle plate formed of first and second legs joined at an apex and having opposite outer forward edge surfaces defining the periphery of the open end of each cup in conjunction with one edge of each of the side plates thereby providing an open end facing the outer peripheral surface of one of said supporting wheels and means for biassing each of said individual pad containing cups toward the respective supporting wheel with which the pad is associated for maintaining the spun glass pads in the pad supporting cups in contact with their associated wheels wherein the forward edge surfaces of said legs of each of said angle members engage the peripheral surfaces of each of said supporting wheels to provide a scraping action on said wheels.

2. The invention of claim 1 wherein said wheeled vehicle has two front wheels on a front axle and two rear wheels on a rear axle and said individual pad containing cups for said rear wheels comprises two rear cups mounted on a rear transverse cup supporting shaft extending parallel to the rear axle of the vehicle and wherein said means for biassing said pad cups comprises a coil compression spring engageable with said rear transverse cup supporting shaft for urging said rear transverse cup supporting shaft toward said rear wheels, and further including aligned apertures in the end plates of each of said rear cups adjacent the apex of the angle member of each rear cup, front pivot pin means extending through said aligned apertures and coaxially connected to the ends of said rear transverse cup supporting shaft whereby said rear cups are pivotally supported, shaft support means for supporting the rear transverse cup supporting shaft for movement toward and away from said rear wheels including rear brackets including a rear horizontal guide plate member from which a threaded support rod means extends and additionally including first and second generally parallel slip plates extending from said rear transverse cup supporting shaft spaced apart a distance greater than the thickness of said rear horizontal guide plate wherein said rear horizontal guide plate is received between said slip plates extending from said transverse cup supporting shaft and by virtue of engagement of said spaced slip plates with the upper and lower surface of said horizontal plate for permitting sliding movement of said slip plates parallel with respect to said horizontal guide plate, while pivotal movement of said slip plates and said transverse supporting shaft with respect to said threaded support rod is prevented, said rear brackets connected to said rear axle, said rear support rod means extending from said rear bracket means and including a threaded outer portion, an aperture medially of said rear transverse cup supporting shaft with said rear support rod means extending through said aperture in said rear transverse cup supporting shaft so that said shaft is supported for movement on said rod means, said coil compression spring encircling said support rod means on the side of said rear transverse cup supporting shaft opposite said slip plates and threaded nut means threaded on said support rod means for engaging said coil compression spring and compressing said coil compression spring to provide a biassing force against said rear transverse cup supporting shaft.

3. In an apparatus for detecting and marking surface irregularities of newly paved surfaces or the like of the type comprising a vehicle having a plurality of supporting wheels, frame means supported by the supporting wheels, surface engaging and sensing means supported by said frame means and marking means actuated by said surface sensing means for marking the surface in response to the detection of a surface irregularity by said surface sensing means, the improvement comprising cleaning and coating means including spun glass pad members and pad supports having individual pad container cups formed of first and second spaced parallel triangular end plates connected by an angle plate formed of first and second legs joined at an apex and having opposite outer edge surfaces defining the periphery of the open end of each cup in conjunction with one edge of each of the side plates thereby providing an open end facing the outer peripheral surface of one of said supporting wheels and means for biasing each of said individual pad containing cups toward the respective supporting wheel with which the pad is associated for maintaining the spun glass pads in the pad supporting cups in contact with their associated wheels wherein said wheeled vehicle has two front wheels on a front axle and two rear wheels on a rear axle and said individual pad containing cups for said rear wheels comprise two rear cups mounted on a rear transverse cup supporting shaft extending parallel to the rear axle of the vehicle and wherein said means for biasing said pad cups comprises a compression spring engageable with said rear transverse cup supporting shaft for urging said rear transverse cup supporting shaft toward said rear wheels, and further including aligned apertures in the end plates of each of said rear cups adjacent the apex of the angle member of each rear cup, front pivot pin means extending through said aligned apertures and coaxially connected to the ends of said rear transverse cup supporting shaft whereby said rear cups are pivotally supported, shaft support means for supporting the rear transverse cup supporting shaft for movement toward and away from said rear wheels including rear brackets including a rear horizontal guide plate member from which a threaded support rod means extends and additionally including first and second generally parallel slip plates extending from said rear transverse cup supporting shaft spaced apart a distance greater than the thickness of said rear horizontal guide plate wherein said rear horizontal guide plate is received between said slip plates extending from said transverse cup supporting shaft and by virtue of engagement of said spaced slip plates with the upper and lower surface of said horizontal plate for permitting sliding movement of said slip plates parallel with respect to said horizontal guide plate, while pivotal movement of said slip plates and said transverse supporting shaft with respect to said threaded support rod is prevented, said rear brackets connected to said rear axle, said rear support rod means extending from said rear bracket means and including a threaded outer portion, an aperture medially of said rear transverse cup supporting shaft with said rear support rod means extending through said aperture in said rear transverse cup supporting shaft so that said shaft is supported for movement on said rod means, said coil compression spring encircling said support rod means on the side of said rear transverse cup supporting shaft opposite said slip plates and threaded nut means threaded on said support rod means for engaging said coil compression spring and compressing said coil compression spring to provide a biassing force against said rear transverse cup supporting shaft.

4. In an apparatus for detecting and marking surface irregularities of newly paved surfaces or the like of the type comprising a vehicle having a plurality of supporting wheels, frame means supported by the supporting wheels, surface engaging and sensing means supported by said frame means and marking means actuated by said surface sensing means for marking the surface in response to the detection of a surface irregularity by said surface sensing means, the improvement comprising cleaning and coating means including spun glass pad members and pad supports having individual pad container cups formed of first and second spaced parallel triangular end plates connected by an angle plate formed of first and second legs joined at an apex and having opposite outer forward edge surfaces defining the periphery of the open end of each cup in conjunction with one edge of each of the side plates thereby providing an open end facing the outer peripheral surface of one of said supporting wheels and means for biassing each of said individual pad containing cups toward the respective supporting wheel with which the pad is associated for maintaining the spun glass pads in the pad supporting cups in contact with their associated wheels wherein said vehicle includes a pair of front wheels on a front axle, and said individual pad containing cups for said front wheels comprise two front cups mounted on a front transverse cup supporting shaft extending parallel to the front axle of the vehicle and further including aligned apertures in the end plates of each of said front cups adjacent the apex of the angle members of each front cup, front pivot pin means extending through said aligned apertures and coaxially connected to the ends of said front cup supporting shaft whereby said front cups are pivotally supported, means supporting said front transverse cup supporting shaft for movement perpendicular to its axis toward and away from said front wheels and having a front support rod connected to a front bracket and including a threaded outer portion, an aperture located medially of said front transverse cup supporting shaft with said front support rod means extending through said aperture in said front transverse cup supporting shaft, a front horizontal guide plate member from which said front threaded support rod extends, and first and second generally parallel front slip plates extending from said front transverse cup supporting shaft spaced a distance apart greater than the thickness of said front horizontal guide plate wherein said front horizontal guide plate is received between said front slip plates extending from said front transverse cup supporting shaft in a sandwiched manner which permits sliding movement of said front slip plates parallel to said front horizontal guide plate while preventing pivotal movement of said front slip plates and said front transverse supporting shaft with respect to said front threaded support rod wherein said front transverse supporting shaft is supported for movement on said front support rod, a front coil compression spring encircling said front support rod on the side of said front transverse cup supporting shaft opposite said front slip plates and threaded nut means threaded on said front support rod for engaging said front coil compression spring to provide a biassing force against said front transverse cup supporting shaft.

* * * * *